(12) United States Patent
Iozia

(10) Patent No.: US 11,952,250 B2
(45) Date of Patent: Apr. 9, 2024

(54) FORKLIFT FOR THE HANDLING OF PNEUMATIC TIRES PROVIDED WITH TRANSPONDER

(71) Applicant: BRIDGESTONE EUROPE NV/SA [BE/BE], Zaventem (BE)

(72) Inventor: Francesco Iozia, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 504 days.

(21) Appl. No.: 17/279,204

(22) PCT Filed: Sep. 23, 2019

(86) PCT No.: PCT/EP2019/075522
§ 371 (c)(1),
(2) Date: Mar. 24, 2021

(87) PCT Pub. No.: WO2020/064630
PCT Pub. Date: Apr. 2, 2020

(65) Prior Publication Data
US 2021/0403297 A1    Dec. 30, 2021

(30) Foreign Application Priority Data

Sep. 26, 2018    (IT) .......................... 102018000008933

(51) Int. Cl.
*B66F 9/075* (2006.01)
*G06K 7/10* (2006.01)
(Continued)

(52) U.S. Cl.
CPC ........ *B66F 9/0755* (2013.01); *G06K 7/10316* (2013.01); *G06K 19/0723* (2013.01); *G06K 19/07764* (2013.01); *G06K 19/07773* (2013.01)

(58) Field of Classification Search
None
See application file for complete search history.

(56) References Cited

U.S. PATENT DOCUMENTS

| | | | | |
|---|---|---|---|---|
| 7,612,673 B2 * | 11/2009 | Onderko | ............... | B66F 9/0755 |
| | | | | 340/572.8 |
| 10,875,710 B2 * | 12/2020 | Uchimura | .............. | B65G 1/137 |
| 2014/0197926 A1 | 7/2014 | Nikitin et al. | | |

FOREIGN PATENT DOCUMENTS

| | | |
|---|---|---|
| CN | 103632114 A | 3/2014 |
| EP | 2733639 A1 | 5/2014 |
| KR | 100911343 B1 | 8/2009 |

OTHER PUBLICATIONS

China National Intellectual Property Administration: Notification of First Office Action (PCT Application Entering the Chinese National Phase) for co-pending Application No. 201980062497.0 (Issue No. 2022012102320290) dated Jan. 26, 2022, 8 pages.

* cited by examiner

*Primary Examiner* — K. Wong
(74) *Attorney, Agent, or Firm* — Patterson Intellectual Property Law, PC

(57) ABSTRACT

A forklift is provided for the handling of pneumatic tires each having a central cavity and a transponder. A gripping device is configured to engage one or more pneumatic tires. A reader device comprises an antenna and is configured to communicate with transponders of the one or more pneumatic tires. A displacement unit supports at least the antenna of the reader device and is configured to move the antenna between a waiting position, wherein the antenna is arranged at a certain distance from the one or more pneumatic tires engaged by the gripping device, and a working position, wherein the antenna is arranged in close proximity to the one or more pneumatic tires engaged by the gripping device and (Continued)

communication is enabled with respective transponders thereof.

18 Claims, 5 Drawing Sheets

(51) Int. Cl.
    *G06K 19/07*     (2006.01)
    *G06K 19/077*     (2006.01)

FORKLIFT FOR THE HANDLING OF PNEUMATIC TIRES PROVIDED WITH TRANSPONDER

TECHNICAL SECTOR

The present invention relates to a forklift for the handling of pneumatic tires provided with transponders.

PRIOR ART

In general, for the handling of pneumatic tires at the end of a production line (typically for the loading of the pneumatic tires into the shipping containers) or in a sorting warehouse, forklift trucks are used that are equipped with a pair of forks which lift (at least) one stack of pneumatic tires from the bottom (typically when the stack of pneumatic tires is placed upon a pallet) or else that are equipped with a pair of grippers that laterally grasp a stack of pneumatic tires.

In the last few years the emergence has been observed of so-called "smart" pneumatic tires which are provided with transponders (i.e., with electronic devices that are suitable to communicate using radio frequency) that make it possible to remotely communicate the identification, characteristics and history of the pneumatic tire.

Consequently, an operator, in addition to handling pneumatic tires by means of a forklift, must also read, using an appropriate reader, the transponders associated with the pneumatic tires, for example in order to verify that the operator is working on the correct pneumatic tires and/or in order to store, within an electronic register, a modification to the position of the pneumatic tires.

Normally the operator that maneuvers the forklift is equipped with a manual reader (i.e., a reader of limited weight that makes it easy to transport): once the pneumatic tires have been loaded onto the forklift the operator descends from the forklift and, approaching the pneumatic tires with the reader, reads the corresponding transponders in order to identify with certainty the pneumatic tires themselves. This operational procedure involves however a significant time loss insofar as the operator must descend from the forklift (therefore having to turn off the forklift and arrange it in a parking configuration), and must also take the manual reader up to each pneumatic tire in order to read the corresponding transponder (i.e., known manual readers are not able to simultaneously read the transponders of all of the pneumatic tires of a stack of pneumatic tires, but rather it is necessary to take the reader up to each individual pneumatic tire of the stack).

In this regard it is important to observe that the maximum reading distance of a transponder embedded within a single pneumatic tire is around 1-2 meters and that a stack of pneumatic tires has a height that is normally greater than meters (greater therefore than the maximum reading distance); furthermore, when numerous pneumatic tires are close together (stacked), shielding and/or reflections can be created due to metallic parts, which further reduce the maximum reading distance of the transponders embedded within the pneumatic tires.

In patent application EP2733639A1 the implementation is described of a reader provided with an elongated antenna which has to be inserted within a stack of pneumatic tires in order to read simultaneously, i.e. all at once, the transponders of all the pneumatic tires of the stack. Such a reader, provided with an elongated antenna, can be used manually by an operator (in this case the stack of pneumatic tires remains stationary and the reader is moved), or else it can be arranged in a fixed position (on the floor from below or within a portal from above) and a forklift is driven so as to insert the stack of pneumatic tires into the antenna (in this case the stack of pneumatic tires moves and the reader remains stationary). However, also what is proposed within patent application EP2733639A1 involves time loss insofar as, in any case, it requires the operator to descend from the forklift in order to insert the antenna into the stack of pneumatic tires, or else it requires the operator to perform rather complex maneuvers in order to insert the stack of pneumatic tires into the antenna (with the risk of damaging the antenna if by chance the pneumatic tires impact against the antenna due to a maneuver error).

DESCRIPTION OF THE INVENTION

The aim of the present invention is to provide a forklift for the handling of pneumatic tires provided with a transponder, which forklift is both free from the disadvantages described above and, contemporaneously, easy and inexpensive to implement.

According to the present invention, a forklift for the handling of pneumatic tires provided with a transponder is provided, as set forth in the annexed claims.

The claims describe preferred embodiments of the present invention forming an integral part of the present description.

BRIEF DESCRIPTION OF THE DRAWINGS

The present invention will now be described with reference to the attached drawings, illustrating, but not limited to, an exemplary embodiment, wherein.

PREFERRED EMBODIMENTS OF THE INVENTION

Figure 1:
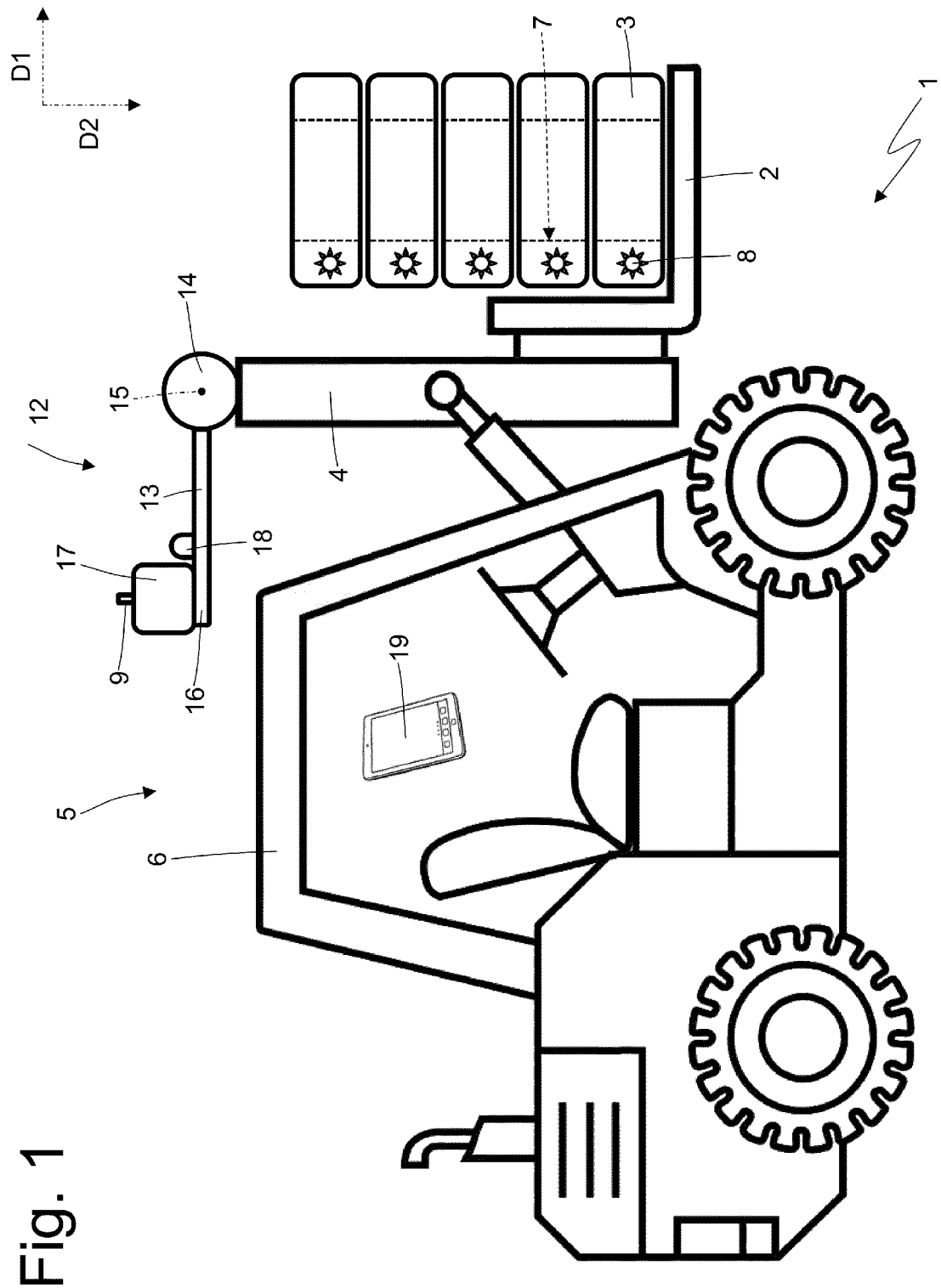
FIG. 1 is a schematic view of a forklift for the handling of pneumatic tires provided with a transponder and implemented according to the present invention.

In FIG. 1, number 1 indicates a forklift in its entirety.

The forklift 1 is an operating means equipped with wheels, it is driven by an electric, diesel or gas motor, and comprises a gripping device 2 which is arranged at the front and that is suitable to pick-up a stack of pneumatic tires 3. The gripping device 2 is mounted in sliding mode within a support body 4 in order to be moved vertically in relation to the support body 4 itself; i.e., the gripping device 2 is raised or lowered by sliding along the support body 4. Preferably, but not necessarily, the support body 4 is mounted in movable mode upon a frame of the forklift 1 in order to be able to vary its inclination (and hence the inclination of the gripping device 2) compared to the vertical reference.

In the embodiment illustrated in the accompanying figures, the gripping device 2 comprises a pair of forks (only one of which is visible in the attached figures), which raise the stack of pneumatic tires 3 from the bottom (normally when the stack of pneumatic tires 3 is placed upon a pallet); according to a different embodiment, not illustrated, the gripping device 2 comprises a pair of grippers that grasp the stack of pneumatic tires 3 laterally (without the need of a pallet).

The forklift 1 further comprises a driver cabin 5 that accommodates a driver and that is bounded at the top by a horizontal roof 6 (which is generally robust insofar as it must provide adequate protection to the driver in the event of the forklift 1 overturning or in the case of objects falling from above onto the forklift 1).

Each pneumatic tire 3 has an annular shape having a central cavity 7. Furthermore, each pneumatic tire 3 is provided with a transponder 8 thereof, i.e., with an electronic device (normally passive, i.e., without a power supply thereof) that is capable of storing information and that is able to communicate by means of radio frequency. In other words, each transponder 8 is a small-sized "smart label" integrated into the pneumatic tire 3 and is suitable to respond to remote queries from specific fixed or portable devices, called readers (or also else querying devices); a reader is capable of reading and/or modifying the information contained within the transponder 8 that is querying whilst communicating with the transponder itself 8 using radio frequency. Accordingly, the transponder 8 is part of a wireless reading and/or writing system that operates according to the so-called RFID technology ("Radio-Frequency IDentification").

The forklift 1 comprises a reader device 9, which is suitable to communicate (interact) with the transponders 8 of the pneumatic tires 3; generally the reader device 9 limits itself to reading the contents of a memory of the transponders 8 essentially in order to identify the corresponding pneumatic tires 3 but the reader device 9 may also (partially) modify the contents of the memory of the transponders 8.

Figure 2:
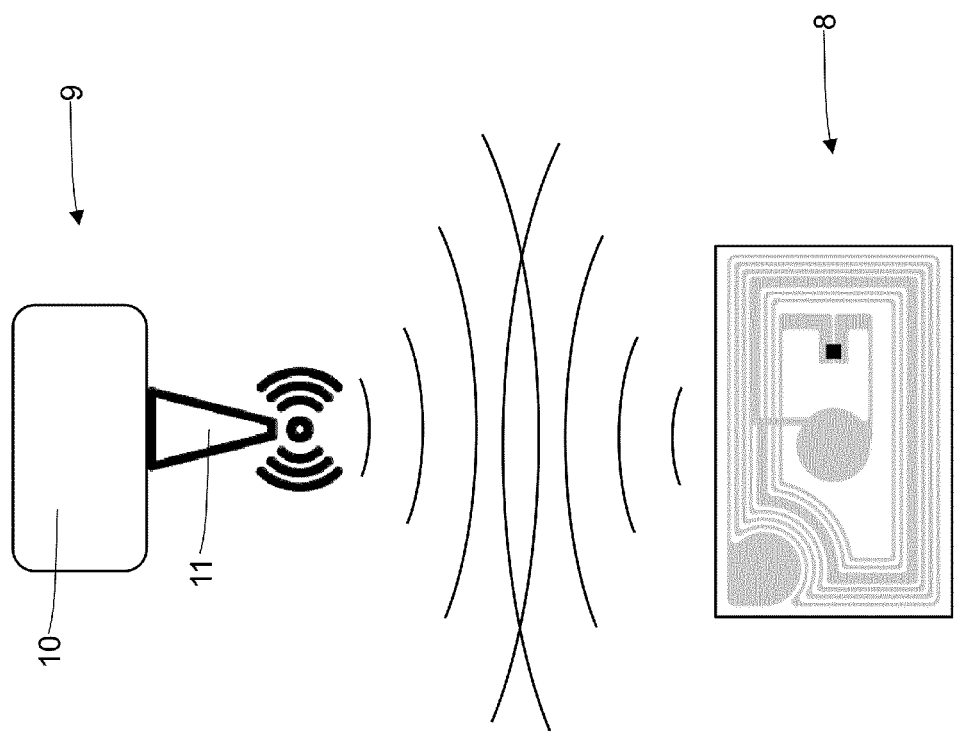
FIG. 2 is a schematic view of a transponder of a pneumatic tire handled by the forklift of FIG. 1 and a reading device of the forklift of FIG. 1.

As illustrated in FIG. 2, the reader device 9 comprises a wireless transmission component 10 (i.e., that makes use of electromagnetic waves) and at least one antenna 11 which emits and receives radio waves; it is possible that the transmission component 10 comprises a plurality (e.g., two, three or four) of antennas 11.

Figure 4:
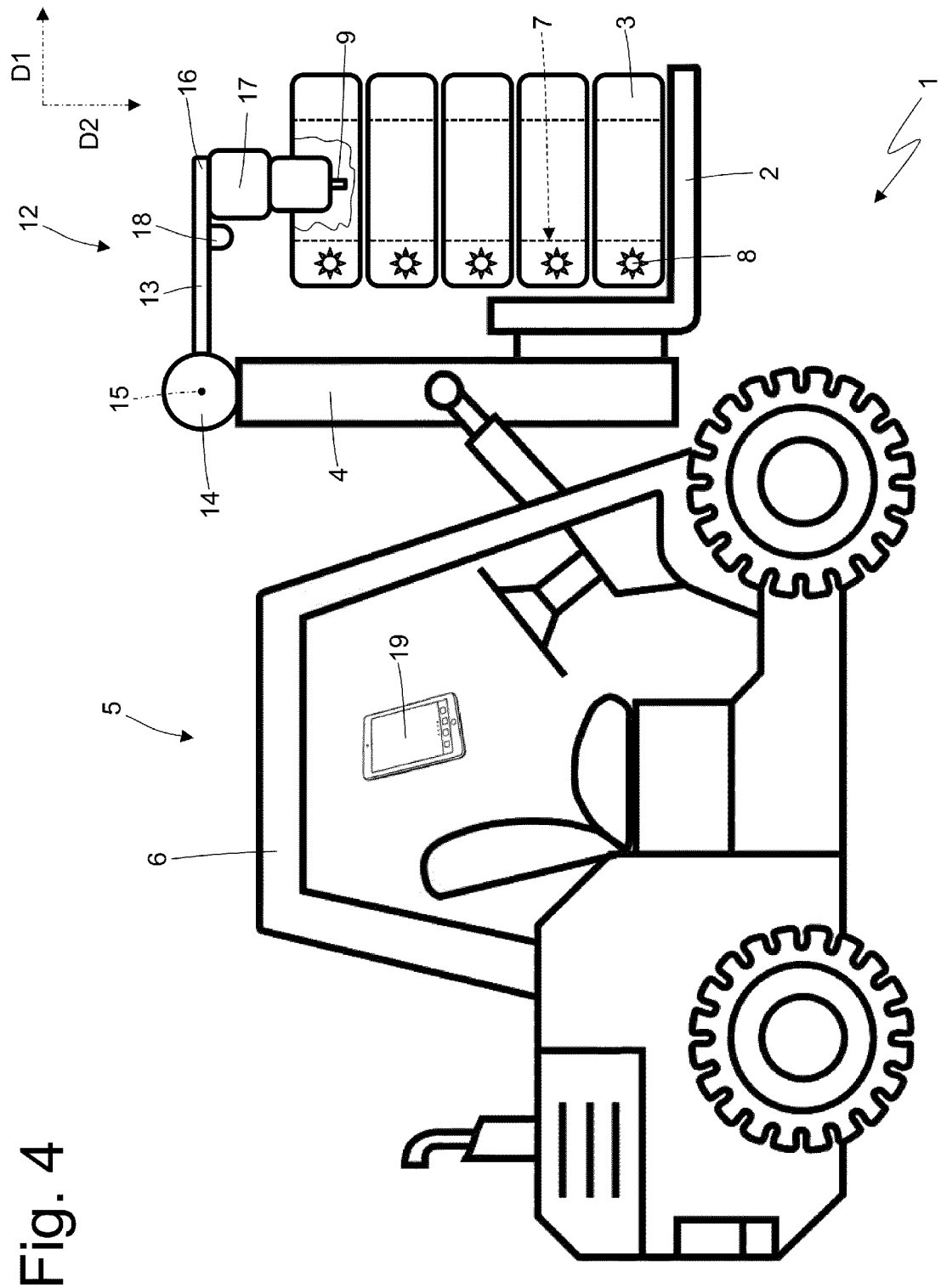

As illustrated in FIG. 1, the forklift 1 comprises a displacement unit 12, which supports at least one part of the reader device 9 and that is suitable for moving the reader device 9 between a waiting position (illustrated in FIG. 1) wherein the reader device 9 is arranged at a certain distance from the stack of pneumatic tires 3 carried by the gripping device 2 (in order not to interfere with the movement of the stack of pneumatic tires 3) and a working position (illustrated in FIGS. 4 and 5) wherein the reader device 9 is arranged in close proximity to the stack of pneumatic tires 3 carried by the gripping device 2. Obviously, in the waiting position (illustrated in FIG. 1), the reader device 9 is not able to communicate with the transponders 8 of the pneumatic tires 3 of the stack whilst in the working position (illustrated in FIG. 4 is 5) the reader device 9 is able to communicate with the transponders 8 of all of the pneumatic tires 3 of the stack.

In the embodiment illustrated in the attached figures, in the working position (illustrated in FIGS. 4 and 5) the reader device 9 is arranged within the central cavities 7 of the pneumatic tires 3 of the stack. According to a different embodiment, not illustrated, in the working position the reader device 9 is arranged externally to the pneumatic tires 3 of the stack (or in close proximity to the tread of the pneumatic tires 3 of the stack).

Figure 3:
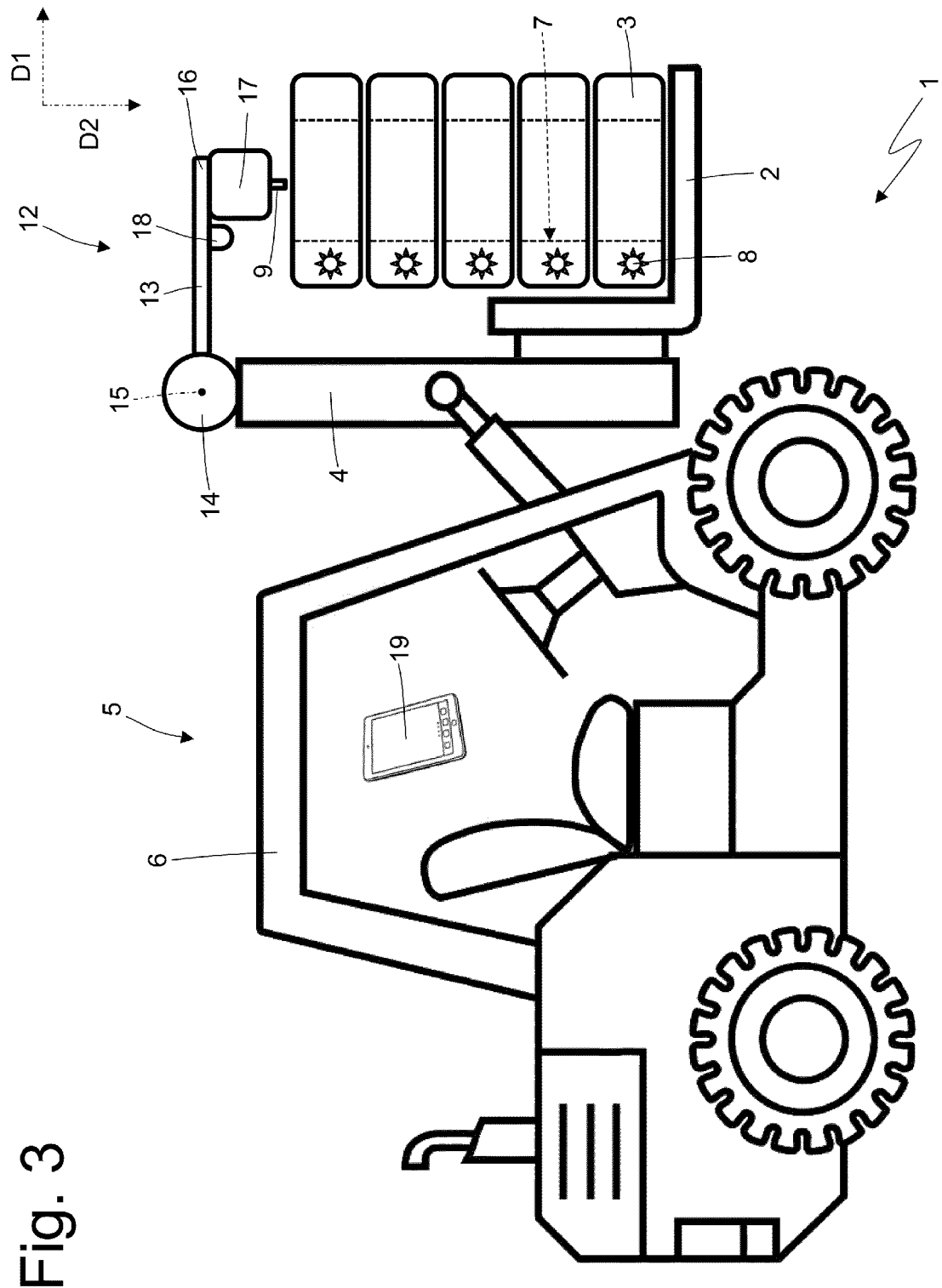
FIGS. 3-5 are further schematic views of the forklift of FIG. 1 wherein the reading device of the forklift is in different positions.

According to a preferred embodiment, the displacement unit 12 is suitable for moving the reader device 9 both along a horizontal direction D1 and along a vertical direction D2 perpendicular to the horizontal direction D1; in the embodiment illustrated in the attached figures, the displacement along the horizontal direction D1 takes place by means of a rotation (as described in greater detail below) and thereafter a displacement along the vertical direction D2 is always added. In particular, the displacement unit 12 moves the reader device 9 essentially along the horizontal direction D1 in order to move the reader device 9 nearer to/further away from the stack of pneumatic tires 3 (compare FIGS. 1 and 3 wherein it is evident that the reader device 9 has been moved nearer to the stack of pneumatic tires 3 by means of a movement essentially along the horizontal direction D1); by comparison, the displacement unit 12 moves the reader device 9 along the vertical direction D2 in order to slide the reader device 9 along the stack of pneumatic tires 3 and in particular within the central cavities 7 (compare FIGS. 3, 4 and 5 from which it is evident that the reader device 9 sliding within the stack of pneumatic tires 3 by means of a movement along the vertical direction D2).

According to the preferred (but non-limiting) embodiment illustrated in the attached figures, the displacement unit 12 comprises an arm 13, which at a first end is hinged to a base 14 so as to rotate around an horizontal axis of rotation 15 and at a second end 16, opposite the first end, it supports the reader device 9. In particular, the displacement unit 12 comprises a telescopic member 17 that is suitable for imparting a linear movement along the vertical direction D2, it is mounted at the end 16 of the arm 13 and directly supports the reader device 9 (i.e., the telescopic member 17 is interposed between the arm 13 and the reader device 9); in other words, the displacement along the horizontal direction D1 takes place by means of rotation around the horizontal axis of rotation and is always combined with displacement along the vertical direction D2; in contrast the displacement along the vertical direction D2 takes place by means of linear displacement.

According to a possible embodiment, the displacement unit 12 is also suitable for rotating the reader device 9 also around a longitudinal axis thereof that is parallel to the vertical direction D2.

According to the embodiment illustrated in the attached figures, the displacement unit 12 is mounted on the top of the support body 4 (i.e., the base 14 of the displacement unit 12 is rigidly attached to the top of the support body 4). According to an alternative embodiment, not illustrated, the displacement unit 12 is mounted on the roof 6 of the driver cabin 5 (i.e., the base 14 of the displacement unit 12 is rigidly attached to the roof 6 of the driver cabin 5); in this embodiment, the displacement unit 12 should be sufficiently light and deformable (for example by making it from aluminum and plastic) in such a way that in the case of the forklift 1 tipping over, the displacement unit 12 will crush against the roof 6 of the driver cabin 5 without breaking into the roof 6 itself and thereby into the driver cabin 5.

As previously mentioned, the reader device 9 comprises the transmission component 10 and the antenna 11; according to a possible embodiment, only the antenna 11 of the reader device 9 is mounted on the displacement unit 12 in order to be moved by the displacement unit 12 itself, between the waiting position and the working position (i.e., the transmission component 10 is arranged in a fixed position on the forklift 1 and never moves); in this case, the transmission component 10 (though separate and independent from the antenna 11) can also be housed within the driver cabin 5 and thus be connected to the antenna 11 by means of an extending coaxial cable (for example partially coiled). If the coaxial cable that connects the transmission component (housed for example within the driver cabin 5) to the antenna 11 were very (too) long then the coaxial cable itself could cause a significant loss of signal power that could be compensated for by means of the insertion of an amplifier.

According to an alternative embodiment, the entire reader device 9 is mounted on the displacement unit 12 in order to be moved by the displacement unit 12 itself, between the waiting position and the working position (i.e., the displacement unit 12 moves both the transmission component 10 and the antenna 11 which form an indivisible unit).

According to a possible embodiment, the displacement unit 12 is manually controlled by the operator of the forklift 1 who is located within the driver cabin 5. According to a different embodiment, the displacement unit 12 is able to perform, in an autonomous or semi-autonomous way, all movements between the waiting position (illustrated in FIG. 1) and the working position (illustrated in FIGS. 4 and 5); in this case, the displacement unit 12 may comprise sensors that are normally arranged next to the reader device 9 (i.e., they are mounted in correspondence with the ends 16 of the arm 13) in order to determine the exact position of the pneumatic tires 3 (and in particular of the central cavities 7 of the pneumatic tires 3). Such sensors may comprise a camera 18 (i.e., an optical sensor) and/or a proximity sensor (the proximity sensor is often directly coupled to the reader device 9 in order to be moved together with the reader device 9 itself). The same sensors can also be envisioned when the displacement unit 12 is manually controlled by the operator of the forklift 1 in order to provide an aid to the same operator 1 (particularly the camera 18).

Figure 5:
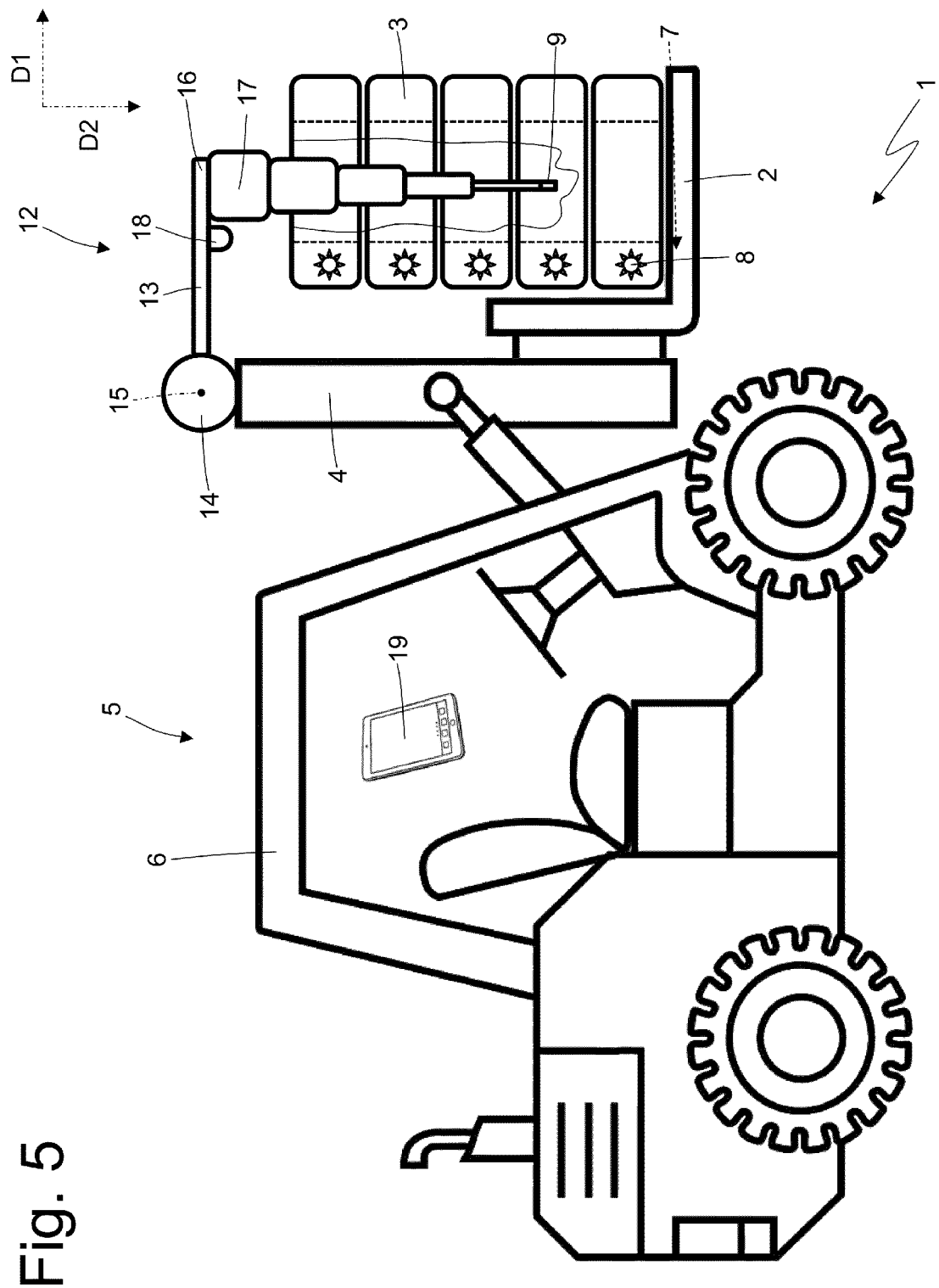

In other words, both in case of manual control of the displacement unit 12 and in case of independent control of the displacement unit 12, a camera 18 is preferably envisioned, which is arranged next to the reader device 9 (i.e., mounted at the ends 16 of the arm 13) and suitable for framing the stack of pneumatic tires 3 when the reader device 9 is in the working position (illustrated in FIGS. 4 and 5).

In the embodiment illustrated in the accompanying figures the stack of pneumatic tires 3 arranged on the gripping device 2 of the forklift 1 is vertically oriented. According to other embodiments, not illustrated, the stack (or stacks accommodated on special racks) of pneumatic tires 3, arranged on the gripping device 2 of the forklift 1, is oriented horizontally; in these embodiments, the displacement unit 12 can slide, by means of a rack or other implementation, upon a guide accommodated on the support body 4 until the antenna 9 arranged with a horizontal axis, turning by 90° upon the support body 4, is made to reach the center of the stack or stacks (in this case, in addition to the arm 13, another extending arm must be added between the support body 4 and the base 14, in order to allow the antenna 11 to enter into the horizontal stacks, insofar as the width of the racks that carry the pneumatic tires 3 is generally greater than the width of the support body 4).

The embodiment illustrated in the accompanying figures requires that a single stack of pneumatic tires 3 is housed on the gripping device 2 of the forklift 1; according to other embodiments, not illustrated, upon the gripping device 2 of the forklift 1 several stacks of pneumatic tires 3 may be housed (two, three, four . . . ) that are adjacent to each other (and that are oriented vertically or horizontally).

To ensure that the operator quickly and safely knows that all of the transponders 8 of the pneumatic tires 3 forming the stack carried by the gripping device 2 have been read, the same operator must from time to time enter (type) the number of pneumatic tires 3 loaded onto the gripping device 2 of the forklift 1.

For this purpose, within the driver cabin 5, a screen is installed that is provided with an input device (such as a physical keyboard or a physical pointing device or a virtual keyboard if the screen is of the touch type) and connected to a computer 19 which in turn is connected to the reader device 9 (obviously a tablet computer could be used that integrates all of the functions into a single physical structure). The software installed on the computer 19, in addition to managing the typing in of the number of pneumatic tires 3 forming the stack carried by the gripping device 2, also displays the codes of all of the transponders 8 that have been read by the reader device 9. Furthermore, the software installed on the computer 19 continually verifies that the number of transponders 8 that have been read by the reader device 9 matches (or is equal to) the number of pneumatic tires 3 on the gripping device 2 of the forklift 1 (given by the operator): in case of parity the software produces a positive signal (for example by means of a green light) and the operation of reading the transponders 8 is concluded, whilst in case of disparity the software produces a negative signal (for example by means a red light and an audible alert) and the operation of reading the transponders 8 has to be repeated.

The computer 19 also performs other functions: for example, the computer 19 can be connected (generally by means of a wireless connection) to a central control system of the warehouse of the pneumatic tires 3 in order to update the stock status in real-time, i.e., those pneumatic tires 3 that have entered and that have left and those that are currently in stock.

The embodiments described herein may be combined without departing from the scope of protection of the present invention.

The forklift 1 described above has many advantages.

Firstly, the forklift 1 described above makes it possible to effectively, safely (i.e., in minimizing the possibility of errors) and efficiently read the transponders 8 of all of the pneumatic tires 3 of the stack carried by the gripping device 2 insofar as it brings the reader device 9 (or at least the antenna 11 of the reader device 9) very close to all of the pneumatic tires 3 of the stack carried by the gripping device 2.

In addition, the forklift 1 described above makes it possible to read, in a quick and simple way, the transponders 8 of all of the pneumatic tires 3 of the stack carried by the gripping device 2 insofar as the operator of the forklift 1 never has to leave the driver cabin 5 during the reading of the transponders 8. Moreover, the reading of the transponders 8 can also take place whilst the forklift 1 is in motion (i.e., during the normal running of the forklift 1 which, in any case is always performed at a reduced speed for obvious reasons of safety).

Finally, the forklift 1 described above is simple and inexpensive to manufacture insofar as it requires the use of components that are commercial, have a relatively low cost and are very easily available on the market.

The invention claimed is:

1. A forklift for the handling of pneumatic tires each having a central cavity and a transponder, the forklift comprising:
   a gripping device configured to engage one or more pneumatic tires;
   a reader device comprising an antenna and configured to communicate with transponders of the one or more pneumatic tires;
   a displacement unit which supports at least the antenna of the reader device and is configured to move the antenna between a waiting position, wherein the antenna is arranged at a certain distance from the one or more pneumatic tires engaged by the gripping device, and a working position, wherein the antenna is arranged in close proximity to the one or more pneumatic tires engaged by the gripping device and communication is enabled with respective transponders thereof.

2. The forklift of claim 1, wherein in the working position the antenna of the reader device is arranged within the respective central cavity of at least one of the one or more pneumatic tires.

3. The forklift of claim 1, wherein the displacement unit is configured for moving the antenna of the reader device along both a horizontal direction and a vertical direction perpendicular to the horizontal direction.

4. The forklift of claim 3, wherein the displacement unit is configured for moving the antenna of the reader device essentially along the horizontal direction in order to move the reader device nearer to/further away from the one or more pneumatic tires and for moving the antenna of the reader device along the vertical direction in order to slide the reader device along the one or more pneumatic tires.

5. The forklift of claim 1, wherein the displacement unit comprises an arm, which at a first end is hinged so as to rotate around a horizontal axis of rotation and at a second end opposite the first end it supports the reader device.

6. The forklift of claim 5, wherein the displacement unit comprises a telescopic member configured to impart a linear movement, is mounted at the second end of the arm, and directly supports the antenna of the reader device.

7. The forklift of claim 1, wherein the displacement unit is configured for rotating the antenna of the reader device around a longitudinal axis thereof.

8. The forklift of claim 1, further comprising:
a driver cabin that is closed at a top portion via roof;
wherein the displacement unit is mounted on the roof of the driver cabin.

9. The forklift of claim 1, further comprising:
a support body whereupon the gripping device is mounted and configured for sliding there along;
wherein the displacement unit is mounted on the top of the support body.

10. The forklift of claim 1, wherein:
the reader device comprises the antenna and a transmission component; and
only the antenna of the reader device is mounted on the displacement unit in order to be moved by the displacement unit itself between the waiting position and the working position.

11. The forklift of claim 1, wherein:
the reader device comprises the antenna and a transmission component; and
the entire reader device is mounted on the displacement unit in order to be moved by the displacement unit itself between the waiting position and the working position.

12. The forklift of claim 1, further comprising:
a camera arranged next to the reader device and configured for framing the one or more pneumatic tires when the reader device is in the working position.

13. The forklift of claim 1, further comprising:
a computer configured to
receive from an operator of the forklift a number of pneumatic tires loaded onto the gripping device,
receive from the reader device a number of transponders read,
verify that the number of pneumatic tires loaded onto the gripping device is equal to the number of transponders read, and
generate an error signal if the number of pneumatic tires loaded onto the gripping device is different from the number of transponders read.

14. A method of operating a forklift for the handling of pneumatic tires each having a central cavity and a transponder, the method comprising:
engaging one or more pneumatic tires; and
moving an antenna between a first position, wherein the antenna is arranged at a certain distance from the engaged one or more pneumatic tires, and a second position, wherein the antenna is arranged in close proximity to the engaged one or more pneumatic tires and communication is enabled with respective transponders thereof.

15. The method of claim 14, wherein in the second position the antenna is arranged within the respective central cavity of at least one of the one or more pneumatic tires.

16. The method of claim 14, comprising moving the antenna in a first direction, along an axis extending through the central cavities of the engaged one or more pneumatic tires, and a second direction perpendicular to the first direction.

17. The method of claim 14, further comprising rotating the antenna around a longitudinal axis of a displacement unit providing at least a portion of the movement between the first position and the second position.

18. The method of claim 14, further comprising:
receiving input from an operator of the forklift corresponding to a number of pneumatic tires engaged by a gripping device thereof;
receiving input from a reader device associated with the antenna and corresponding to a number of transponders read;
verifying that the number of pneumatic tires engaged by the gripping device is equal to the number of transponders read; and
generating an error signal if the number of pneumatic tires engaged by the gripping device is different from the number of transponders read.

* * * * *